US008931737B2

(12) United States Patent
Savignac et al.

(10) Patent No.: US 8,931,737 B2
(45) Date of Patent: Jan. 13, 2015

(54) SHOWER SYSTEM FOR AIRCRAFT

(75) Inventors: Stephane Savignac, Quebec (CA);
Jean-Francois Boies, Quebec (CA);
Bruce Malek, Quebec (CA)

(73) Assignee: Bombardier Inc., Dorval, Quebec (CA)

( * ) Notice: Subject to any disclaimer, the term of this patent is extended or adjusted under 35 U.S.C. 154(b) by 949 days.

(21) Appl. No.: 13/122,502

(22) PCT Filed: Oct. 2, 2008

(86) PCT No.: PCT/IB2008/002606
§ 371 (c)(1),
(2), (4) Date: Jul. 15, 2011

(87) PCT Pub. No.: WO2010/038095
PCT Pub. Date: Apr. 8, 2010

(65) Prior Publication Data
US 2011/0258769 A1   Oct. 27, 2011

(51) Int. Cl.
*B64D 11/00*   (2006.01)
*B64D 11/02*   (2006.01)
*A47K 3/28*    (2006.01)

(52) U.S. Cl.
CPC ..................................... *B64D 11/02* (2013.01)
USPC ........................................... 244/118.5; 4/596

(58) Field of Classification Search
CPC ........... B64D 11/02; B64D 2011/0046; B64D 2011/00
USPC .................... 244/118.5; 4/596, 597, 612, 613
See application file for complete search history.

(56) References Cited

U.S. PATENT DOCUMENTS

| 2,055,173 | A | * | 9/1936 | Deubelbeiss | 4/613 |
| 3,938,764 | A | * | 2/1976 | McIntyre et al. | 244/117 R |
| 4,084,270 | A | * | 4/1978 | Kersten, Jr. | 4/615 |
| 4,348,777 | A |   | 9/1982 | Peterson | |
| 4,829,608 | A | * | 5/1989 | Stevens et al. | 4/597 |
| 5,329,650 | A | * | 7/1994 | Zaccai et al. | 4/605 |
| 5,606,829 | A | * | 3/1997 | Hararat-Tehrani | 52/1 |
| 6,470,512 | B1 |   | 10/2002 | Lau et al. | |
| 6,604,709 | B1 |   | 8/2003 | Wentland et al. | |
| 7,168,108 | B2 |   | 1/2007 | Guerin et al. | |
| 2008/0052818 | A1 | * | 3/2008 | Gross et al. | 4/612 |

FOREIGN PATENT DOCUMENTS

| EP | 1103213 A2 | 5/2001 |
| EP | 1338508 A2 | 8/2003 |
| EP | 1346912    | 11/2007 |

OTHER PUBLICATIONS

International Search Report for International Patent Application No. PCT/IB2008/002606, mailed Jul. 1, 2009.

* cited by examiner

*Primary Examiner* — Rob Swiatek
(74) *Attorney, Agent, or Firm* — Thomas, Karceski & Karmilovich, PC

(57) ABSTRACT

A shower unit for an aircraft comprises: a shower head, and controls to manually control the water output. A shower enclosure defines a receiving cavity to receive the user. The shower enclosure supports the shower head and the controls for the user to shower in the receiving cavity. The shower enclosure comprises a first door on a first side of the shower enclosure, and a second door on a second side of the shower enclosure to define a passageway through the shower enclosure. The shower unit is adapted to be positioned in the aircraft such that the passageway communicates between two separate zones of the aircraft.

18 Claims, 7 Drawing Sheets

SHOWER SYSTEM FOR AIRCRAFT

CROSS-REFERENCE TO RELATED APPLICATION(S)

This is a National Stage Entry into the United States Patent and Trademark Office from International PCT Patent Application No. PCT/IB2008/002606, having an international filing date of 2 Oct. 2008, the contents of which is incorporated herein by reference.

FIELD OF THE APPLICATION

The present application relates to shower systems for transportation vehicles, and more particularly to a shower system used in aircraft.

BACKGROUND OF THE ART

A plurality of factors are considered when designing shower systems for transportation vehicles such as aircraft. For example, space is limited in aircraft, whereby the available space must be used effectively. Also, the fuselage defines dimensional restrictions to the cabin of a plane. In business aircraft, lavatory enclosures are often found to be small, giving limited movement space to the user.

Various shower systems have been designed for aircraft. However, due to their voluminous nature, aircraft showers constitute a physical obstacle that must be bypassed if they were to be centrally positioned in the cabin. Therefore, the aircraft showers are positioned against the walls defined by the fuselage so as to liberate the center of the cabin and allow passengers to access areas beyond the shower. In the case of smaller fuselage aircraft, the height of the showers are limited by the arcuate shape of the fuselage, with the result that such shower enclosures typically require the user to be seated,

SUMMARY OF THE APPLICATION

It is therefore an aim of the present disclosure to provide a shower system that addresses issues associated with the prior art, Therefore, in accordance with the present application, there is provided a shower unit for an aircraft, comprising: at least one shower head adapted to output water from a water source; at least one control to manually control the water output by the at least one shower head; and a shower enclosure defining a receiving cavity adapted to receive the user, the shower enclosure supporting the at least one shower head and the at least one control for the user to shower in the receiving cavity, the shower enclosure comprising a first to on a first side of the shower enclosure, and a second door on a second side of the shower enclosure to define a passageway through the shower enclosure; wherein the shower unit is adapted to be positioned in the aircraft such that the passageway communicates between two separate zones of the aircraft.

Further in accordance with the embodiment, the shower unit according to claim 1, wherein any one of the first door and the second door is connected to the shower enclosure so as to be fully stowed inside the receiving cavity when opened.

Still further in accordance with the embodiment, both the first door and the second door are connected so the shower enclosure so as to be fully stowed inside the receiving cavity when opened.

Still further in accordance with the embodiment, the second door on the second side of the shower enclosure is opposite the first door on the first side of the shower enclosure.

Still further in accordance with the embodiment, the first door is a sliding door sliding into the receiving cavity toward an opened position, and the second door is a hinged door pivoting into the receiving cavity toward an opened position, to define the passageway.

Still further in accordance with the embodiment, the second door provides access to a baggage zone of the aircraft.

Still further in accordance with the embodiment, the first door and the second door are on a same side of the passageway when opened.

Still further in accordance with the embodiment, the first door and the second door are opposite the at least one control when opened.

Still further in accordance with the embodiment, a decompression panel is provided in the shower enclosure, the decompression panel adapted to separate from a remainder of the shower enclosure when a pressure differential between an interior and an exterior of the shower enclosure is above a predetermined threshold.

Still further in accordance with the embodiment, the decompression panel is made of at least, one of a translucent and a transparent material adapted to allow light to pass from an exterior to an interior of the shower enclosure.

Still further in accordance with the embodiment, the decompression panel is connected to a remainder of the shower enclosure by shear pins adapted to break at the predetermined threshold.

Still further in accordance with the embodiment, a shower console has a body connecting the at least one shower head and the at least one control to the shower enclosure.

Still further in accordance with the embodiment, a floor light is provided at a bottom of the shower console to illuminate the passageway.

Still further in accordance with the embodiment, light sources are provided between vertical edges of the body and the shower enclosure.

Still further in accordance with the embodiment, an exhaust vent is provided in the shower enclosure, the exhaust vent being adapted to exhaust moist air from the shower enclosure.

Still further in accordance with the embodiment, an integral floor module is provided.

Still further in accordance with the embodiment, the integral floor module has an upper surface molded so define upwardly projecting tiles between channels, the upper surface being pan-shaped to direct water from the channels to a drain.

Still further in accordance with the embodiment, the shower enclosure is oriented in the aircraft such that a user's intended position within the shower enclosure is in register with a vertical plane in which lies a central longitudinal axis of the aircraft.

Still further in accordance with the embodiment, a cavity is provided in a wall of the shower enclosure and a bar is transversely positioned in the cavity to define a rack for holding objects, the bar being anchored to the wall of the shower enclosure so as to form a handrail adapted to be held by a user in case of turbulence.

Still further in accordance with the embodiment, the level of a floor of the shower enclosure is below the level of floors surrounding the shower enclosure opposite the first door and the second door.

Still further in accordance with the embodiment, a mat is releasably positioned on the floor of the shower enclosure when the shower enclosure is used as a passage, the mat having a thickness such that a top surface of nice mat is generally flat and level with the floors surrounding the shower enclosure opposite the first door and the second door.

Still further in accordance with the embodiment, a valve is provided outside of the shower enclosure, the valve allowing/blocking a supply of water to the at least one shower head independently from the at least one control.

DESCRIPTION OF THE PREFERRED EMBODIMENTS

Figure 1:
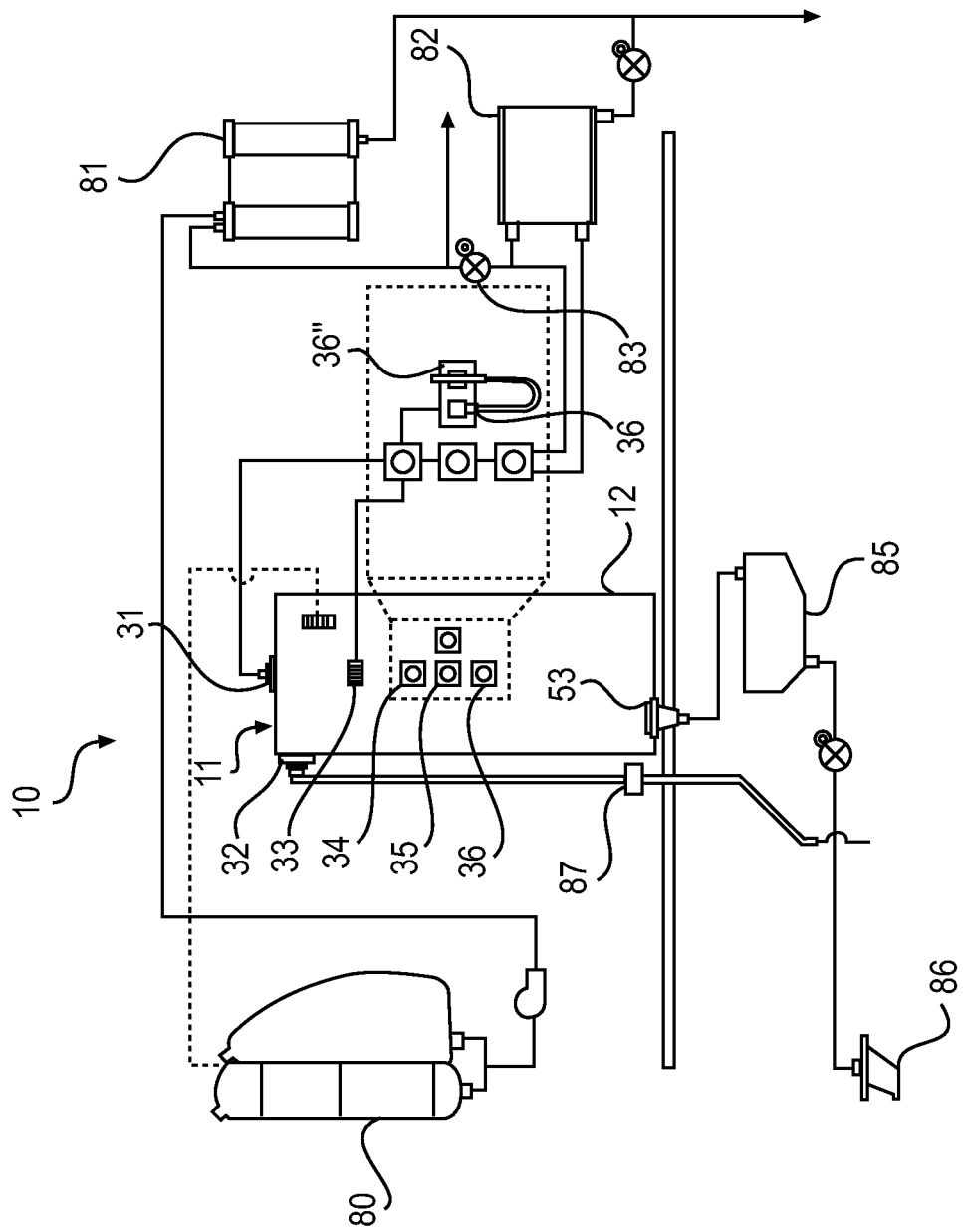
FIG. 1 is a schematic view of a shower system for aircraft in accordance with an example embodiment.
Figure 2:
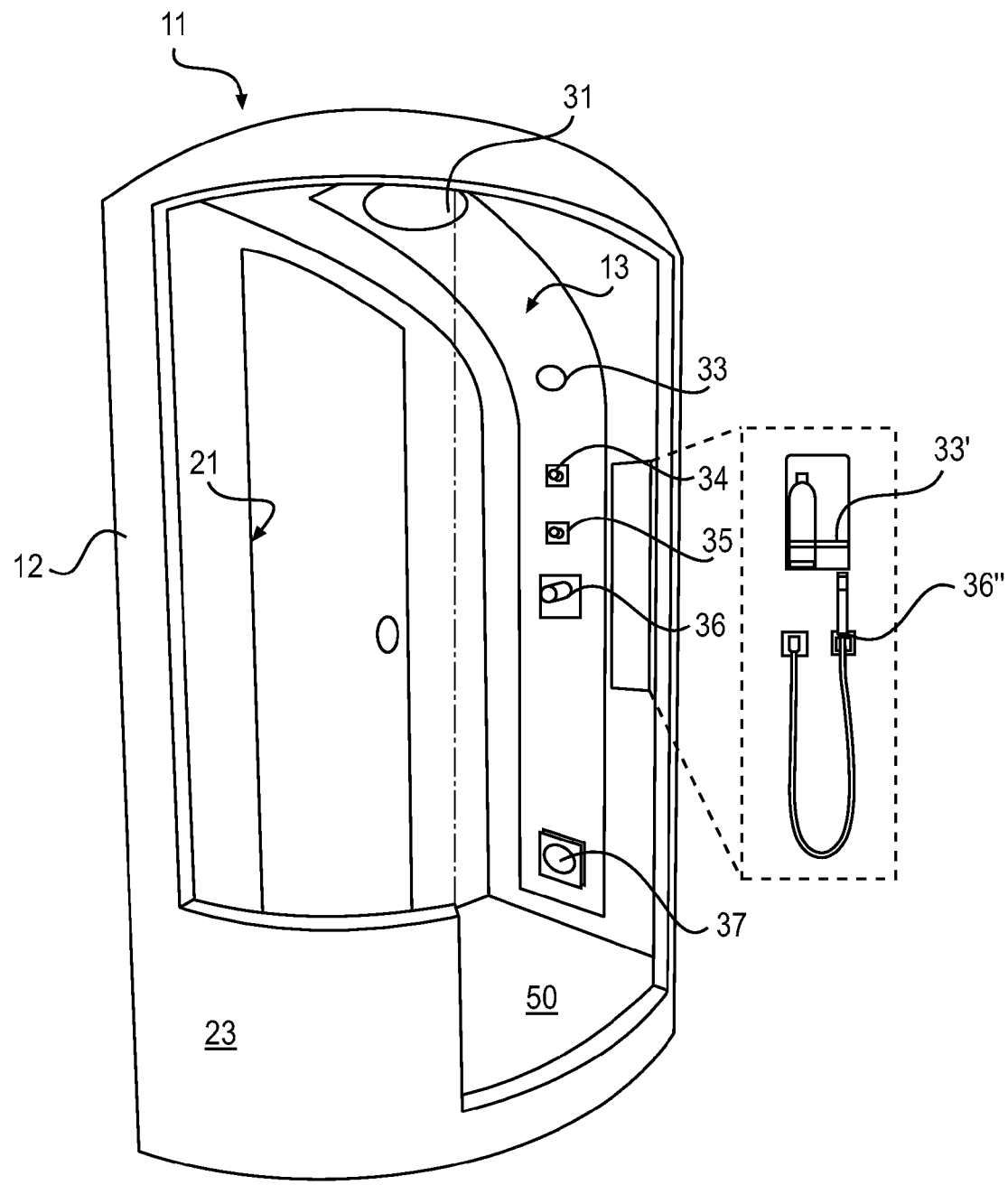
FIG. 2 is a perspective view of a shower unit of the shower system of FIG. 1.

Referring to the drawings, and more particularly to FIG. 1, a shower system for aircraft is generally shown at 10, and has a shower unit 11. Referring to FIG. 2, the shower unit 11 comprises a shower enclosure 12 and a shower console 13 representing the interface of the user with the shower system 10.

Figure 3:
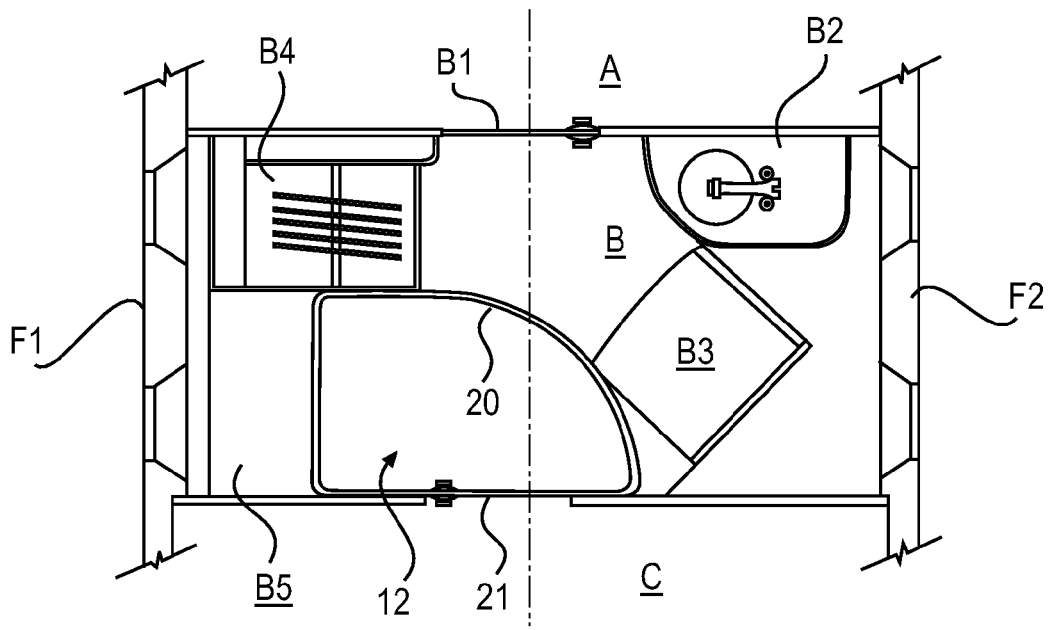
FIG. 3 is a plan view of a washroom incorporating the shower unit of FIG. 2, in a wet-zone configuration for the shower unit.

Referring to FIGS. 2 and 3, the shower enclosure 12 defines the receiving cavity in which the user showers. The shower enclosure 12 has an entry door 20 through which a user enters the shower enclosure 12 from the washroom. The entry door 20 is preferably made of a see-through material when the shower unit 11 is used in a private washroom, but may also consist of opaque or translucent materials, for example in other applications.

In the illustrated embodiment, the shower enclosure 12 also has a passage door 21, through which a second zone is accessed. The passage door 21 is preferably made of an opaque material, with all necessary measures being taken to avoid penetration of shower water into the second zone. Therefore, the door 21 is sealingly closeable. As seen in FIG. 2, an upper edge of the door 21 is arcuate to conform to a shape of the ceiling of the aircraft. However, the upper edge of the door 21 may have other shapes, and may for instance have a straight upper edge.

The shower enclosure 12 also has a decompression panel 22, mounted so a support wall 23 of the shower enclosure 12. As will be described in further detail hereinafter, the decompression panel 22 is adapted to detach from a remainder of the shower enclosure 12 in the event of a decompression between zones of the cabin of the aircraft, as will be described hereinafter. The decompression panel is preferably made of a see-through material for a private washroom.

Referring to FIG. 3, a floor plan of a portion of the cabin is provided with a first zone A (e.g., seating/living zone or the like), a washroom B and a second zone C (e.g., a baggage zone or the like), to illustrate a positioning of the shower unit 11 within the washroom B. The first zone A is fore of the washroom B in the cabin, whereas the second zone C is aft of the washroom B, as visible from the left side F1 and the right side F2 of the fuselage of the aircraft. The washroom B is a private washroom designed to be used by one user at a time. The washroom B is accessed by the first area A through the access door B1. The washroom B has a sink B2, a toilet B3 and a closet B4, which form part of the dry zone of the washroom B. In addition, there is some space B5 behind the shower unit 11, which space B5 is used to accommodate plumbing equipment that is part of the shower system 10. The space B5 is available as a result of the shower enclosure 12 being centralized in the cabin.

In FIG. 3, the shower enclosure 12 is in a wet-zone configuration, with both doors 20 and 21 being closed. The user may simply enter the shower enclosure 12 by opening the entry door 20. The door 21 remains closed when the shower unit 11 is being used for a shower.

Figure 4:
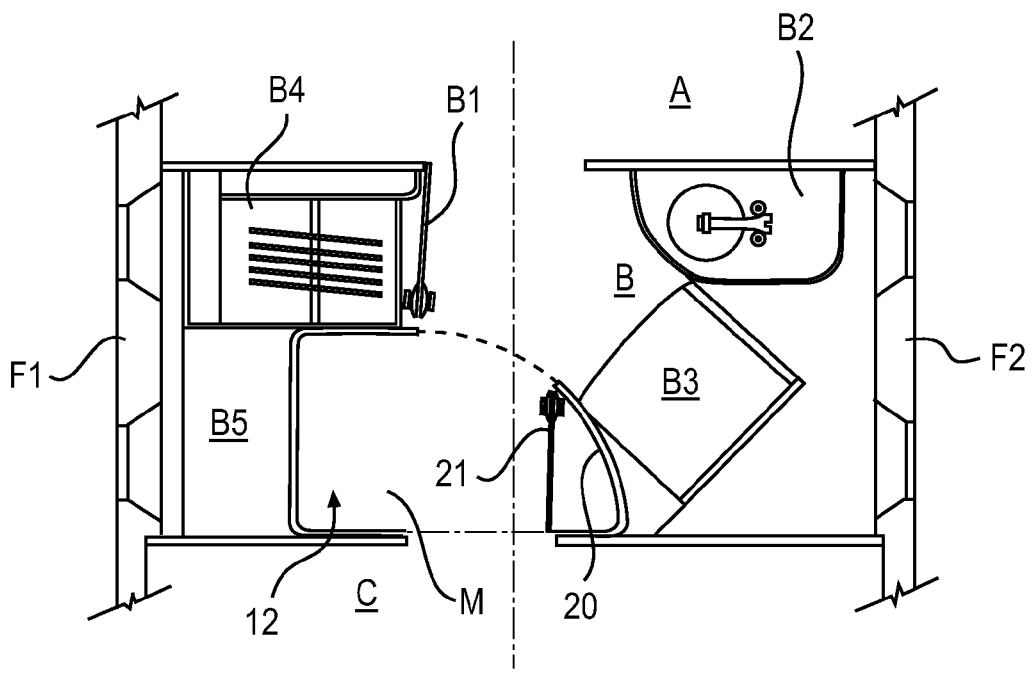
FIG. 4 is a plan view of the washroom of FIG. 3, in a dry-zone configuration for the shower unit.

Referring to FIG. 4, the shower enclosure 12 is shown in a dry-zone configuration. In this configuration, the doors 20 and 21 are both opened in order to define a wide passageway between two (2) dry zones, i.e., the first zone A and the second zone C. In this configuration, the shower unit 11 is used as a passageway and is therefore considered a dry zone as it cannot be used as a shower.

In order to facilitate the use of the shower unit 11 in the dry-zone configuration of FIG. 4, the shower enclosure 12 is designed so minimize the amount of space taken by the doors 20 and 21 when both are opened. As shown in FIG. 4, the entry door 20 is a sliding door that stows into the shower enclosure 12, away from the shower console 13. Other types of mechanisms can be used for the entry door 20, but the use of a sliding mechanism allows the shower enclosure 12 to support the entry door 20 without visible hinges interfering with the visual aspect of the door 20, for instance if the door 20 is made of a transparent material. The door 20 may be hinged, but this is not preferred because, if it were hinged to move outwardly, the door 20 would take up space in the washroom B, making it difficult to operate by a user positioned in washroom B, and, if it were hinged to move inwardly, the door 20 would be difficult to operate by a user once positioned in the shower enclosure 12.

The passage door 21 is hinged to the wall separating the washroom B from the second zone C, and pivots into the shower enclosure 12. Both doors 20 and 21 are on the same side of the shower enclosure 12 when opened, namely away from the shower console 13. This provides additional space in the dry-zone configuration (FIG. 4) to handle bigger pieces of luggage, as the resulting area of the shower is greater than if door 21 were to open towards the shower console 13. The combination of a sliding door with a hinged door minimizes the stowing space required for the opened doors, while maximizing the space of the passageway. Moreover, as it is hinged to move into the shower enclosure 12 in the opened position, the passage door 21 does not take up any space in the second zone C, thereby allowing storage space to be maximized. However, in cases where the intrusion of door 21 into second zone C is not problematic, door 21 may be hinged to pivot outwardly into such one C. Other door mechanisms are possible as well to optimize the passageway between zones, such as the use of a gliding door for door 21.

In order to facilitate the use of the passageway between zones in the dry-zone configuration of the shower unit 11, blocking mechanisms are provided to keep the doors 20 and 21 in their opened position.

Figure 9:
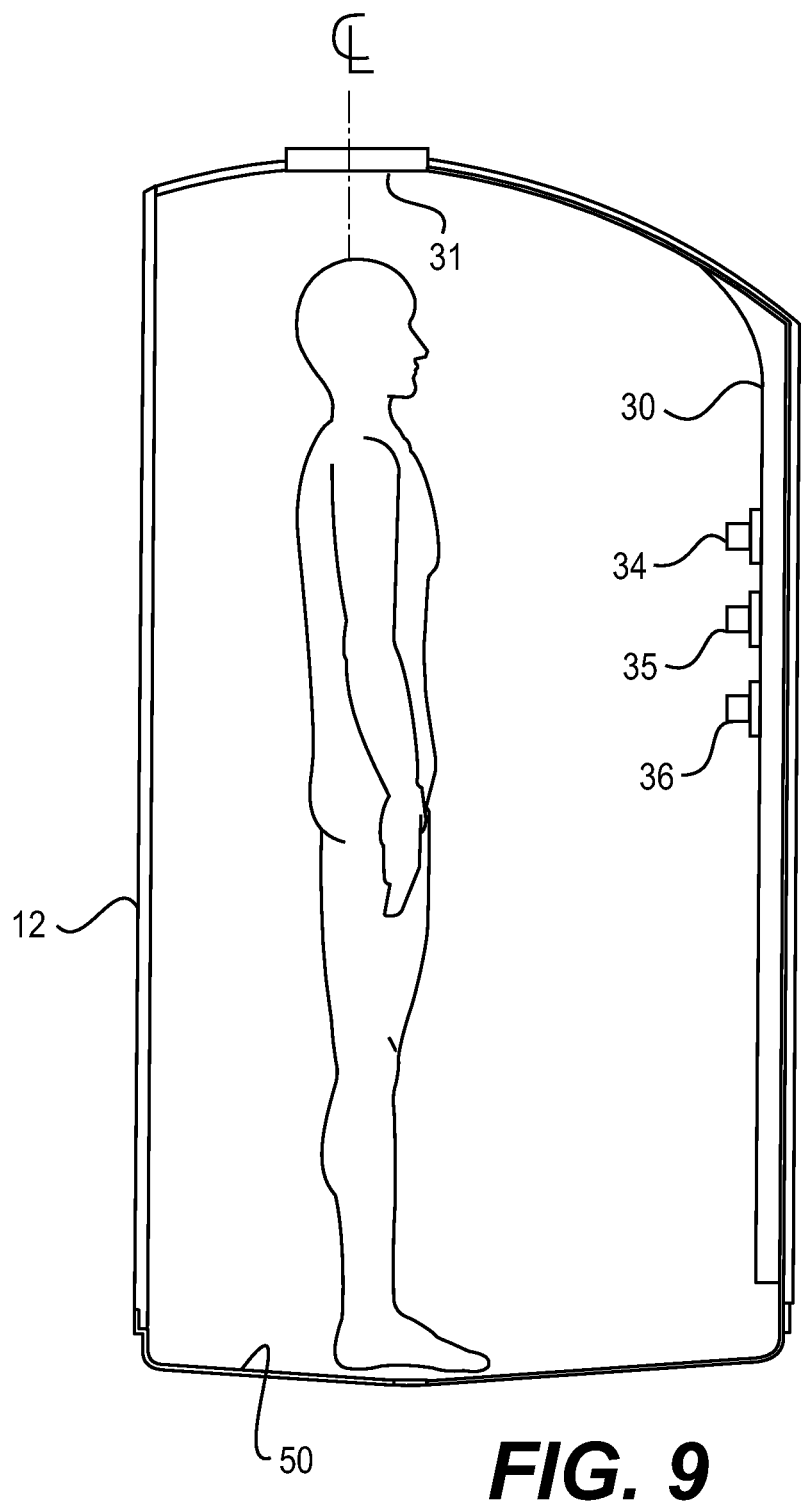
FIG. 9 is a schematic view illustrating an alignment of the intended position of a user within the shower unit of FIG. 2 with a centerline of an aircraft.

The above-described wet-zone and dry-zone configurations allow a top (or head) of the shower enclosure 12, which corresponds to an intended position of a user within the shower, to be aligned with a central longitudinal axis of the fuselage, as illustrated in FIGS. 3, 4 and 9. This alignment maximizes the vertical space available to the user of the shower, as shown in FIG. 9. Therefore, smaller aircraft may be equipped with a shower enclosure providing the above-described wet-zone and dry-zone configurations, thereby enabling a stand-up posture for the users of the shower unit 11, despite the size restrictions of the fuselage of these planes. Moreover, even though it is centralized, the shower unit 11 no longer constitutes an obstacle that must be surrounded to move between zones of the aircraft. The above-described wet-zone and dry-zone configurations enable the passengers to benefit in the current embodiment from both an easily accessible luggage space and a stand-up shower.

Larger planes may also be equipped with a shower having the above-described wet-zone and dry-zone configurations, yet not necessarily have the intended position of the shower's user in register with the vertical plane in which lies the central longitudinal axis of the plane. Moreover, the above-described wet-zone and dry-zone configurations are not limited to being used between the first zone A and second zone C. Aircraft may have different configurations.

According to another configuration, the passage door 21 would give access to the space B5 instead of to the zone C. The second zone C would then be accessed from the space B5 in this configuration, the shower console 13 is positioned on the same side as the wall of the shower enclosure 12 separating the washroom B from the second zone C. The plumbing components of the shower unit 11 would be behind the shower console 13, either within the washroom B or in the second zone C.

Figure 5:
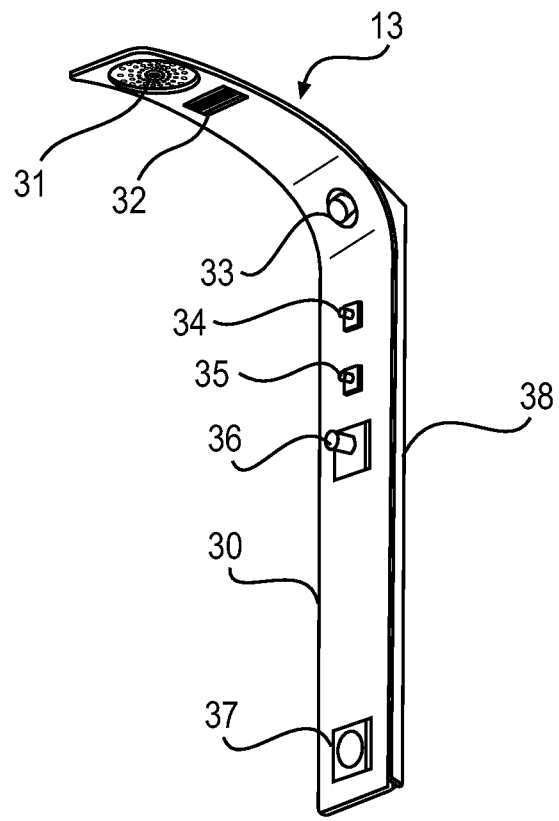
FIG. 5 is a perspective view of a shower console of the shower unit of FIG. 2.

Referring so FIG. 5, the shower console 13 is shown in greater detail. The shower console 13 is an optional part of the shower unit 11, as its components may be imbedded in a wall of the shower enclosure 12. However, the shower console 13 provides ornamental features, while supporting components giving the shower unit 11 functional features. The shower console 13 has a body 30 that is secured to the shower enclosure 12. The body 30 supports a plurality of interfaces by which the user controls the shower system 10. Referring concurrently to FIGS. 1 and 5, the console 13 supports a shower head 31. The shower head 31 is placed above the intended position of the user, and may be of any suitable type. In an embodiment, the shower head 31 is of the type producing a rain-like stream of water.

An exhaust vent 32 is also provided in the console 13. The exhaust vent 32 is adjacent to the shower head 31 and to a body-spray head 33. The exhaust vent 32 is in the shower enclosure 12. Accordingly, as the entry door 20 is closed during a shower, the water vapor resulting from a shower is confined to the shower enclosure 12. Therefore, the position of the exhaust vent 32 within the shower enclosure 12 increases its efficiency in exhausting water vapor, as the volume the vent 32 must serve is reduced by the closed entry door 20. There is also no need to provide an exhaust vent within the washroom B, so that the design requirements of such washroom B remains the same whether there is a shower or not.

A body-spray head 33 is provided below the exhaust vent 32. The head 33 is preferably equipped with a swivel-mount, whereby the user may manually adjust the direction of the water stream.

A set of water controls is provided below the body-spray head 33. As shown in FIG. 2, a handrail 33' anchored to the shower enclosure 12 is adjacent to the water controls, to provide support to the user, for instance in the event of turbulence. The handrail 33' is a bar placed in a cavity in the wall of the shower enclosure 12, and therefore forms a rack for objects such as soap, shampoo bottles or the like. The water controls comprise a diverter valve 34, an on/off valve 35 and a temperature valve 36. The diverter valve 34 is used to select between the shower head 31, the body-spray head 33 and other items such as a water tester 36' (FIG. 1) or a handheld shower head 36" (FIG. 2). As the amount of water available is limited on an aircraft, it is preferred to limit the shower unit 11 to operating one head at a time. The on/off valve 35 is used to initiate or stop the water stream from the heads. The temperature valve 36 is provided for the user to control the water temperature. As will be described hereinafter, the temperature valve 36 is connected to a heater. Although three different controls are shown in FIG. 5, more or fewer controls may be provided for the shower unit 11.

A floor light 37 is imbedded in a bottom of the shower console 13. The floor light 37 directs light to the floor. As the floor of the shower unit 11 is used as a passageway in the dry-zone configuration of FIG. 4, the floor light 37 conveniently ensures that the passageway is illuminated in the shower enclosure 12. It is considered to equip the floor light 37 with a dome lens to spread the light within the shower enclosure 12.

Figure 6:
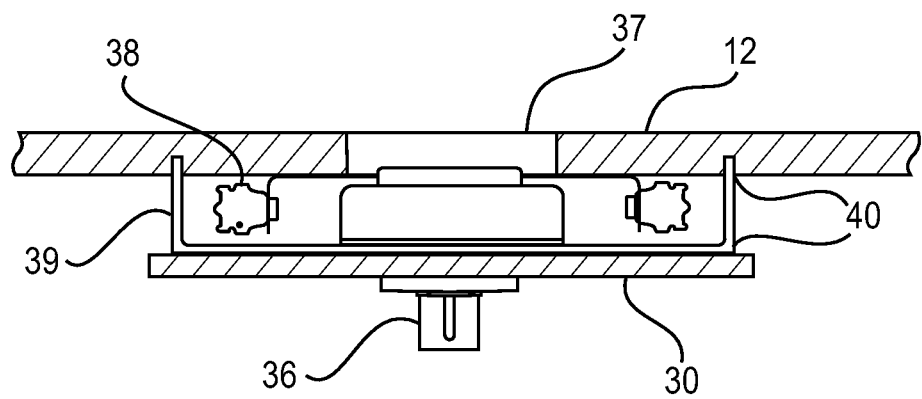
FIG. 6 is a sectional view of the shower console.

Referring to FIGS. 5 and 6, vertical lighting units 38 are mounted be the shower console 13. The lighting units 38 are lighting tubes or any other suitable light source (such as LEDs) concealed within a lens 39. The lens 39 ensures a relatively uniform diffusion of the light, and forms a protective barrier by way of seals 40 preventing water infiltration.

Figure 7:
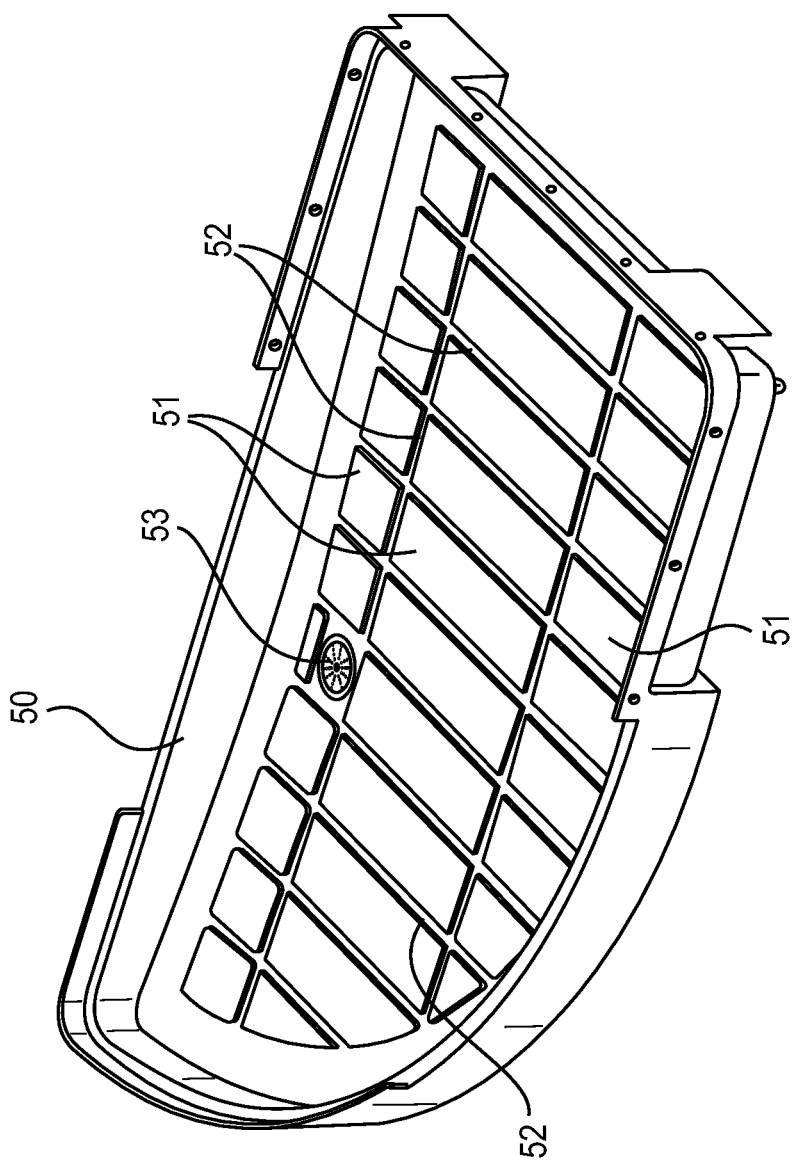
FIG. 7 is a perspective view of a floor module for the shower unit of FIG. 2.

Referring to FIG. 7, a floor module as used in The shower enclosure 12 is illustrated at 50. In the example embodiment of FIG. 7, the floor module 50 is an integrally molded module comprising on its exposed surface tiles projecting upwardly, with channels 52 between the tiles 51. The exposed surface is pan-shaped to direct gray water from The shower to drain 53. The tiles 51 are preferably molded or manufactured to define an anti-slip finish for the safety of the user.

The level of the upper surface of the floor module 50 is preferably below that of the floor of the washroom B and second zone C, to maximize headroom in shower 12 and reduce the risk of having water flowing out of the shower onto the surrounding floors. The advantage of such a configuration is that one can use a mat M, carpet or the like, which covers and protects the floor module 50 when the shower enclosure 12 is used as a passage, to bring the level of such shower enclosure 12 up to that of the surrounding floors, especially the floor of washroom B. The mat M is preferably made with a varying thickness conforming to the shape of the floor module 50, such that the mat M defines a generally flat surface when installed in the floor module 50. Furthermore, the mat M is made of a fabric with anti-slip qualities for safety purposes.

Figure 8:
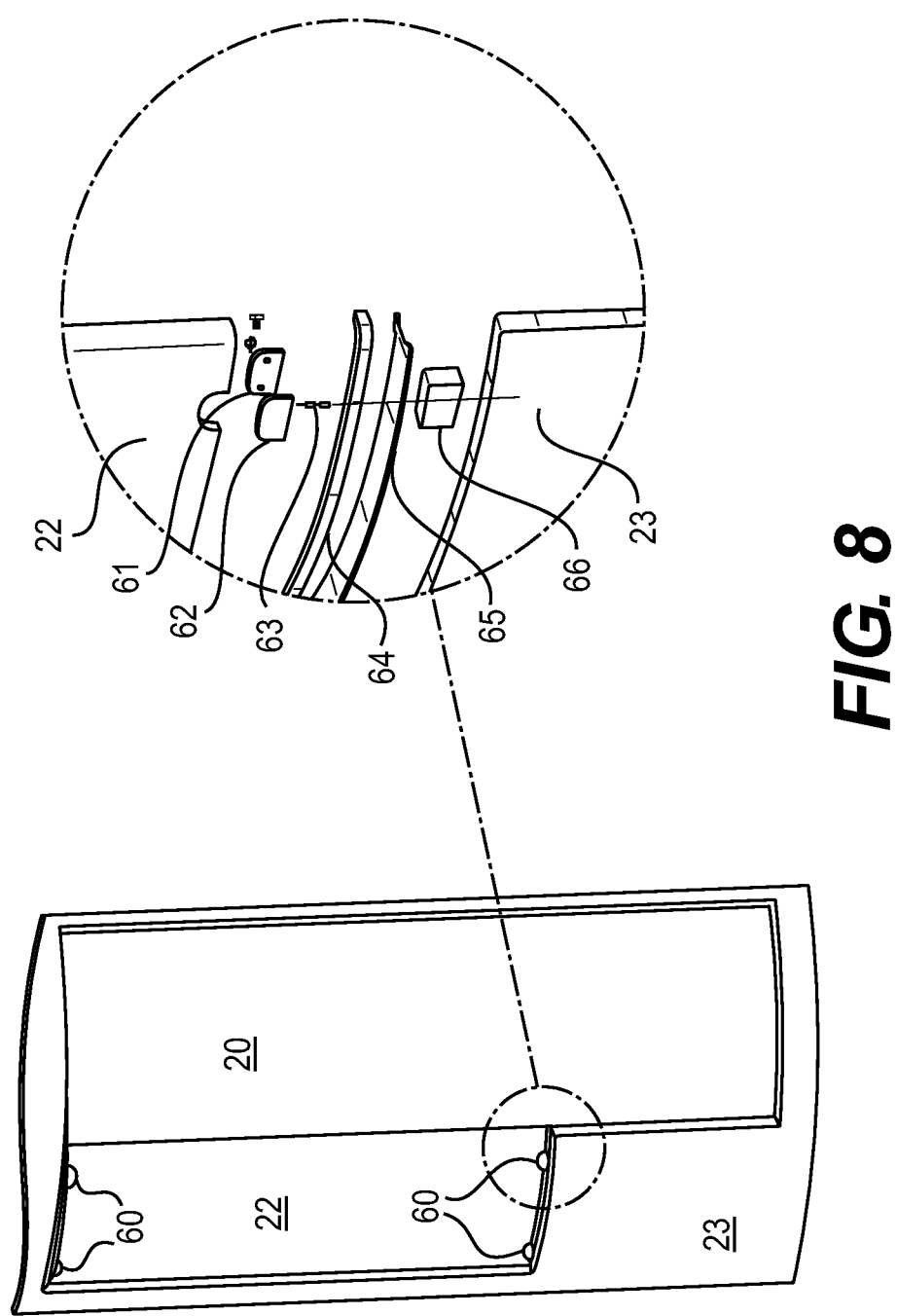
FIG. 8 is an enlarged view of a decompression connector for the shower unit of FIG. 2.

Referring to FIG. 8, the decompression panel 22 is shown having four decompression connectors 60 supporting it to the shower enclosure 12. The decompression panel is necessary in the current embodiment because shower 12, when closed, interferes with a decompression pathway, more specifically door 21 between second zone C and shower B; in cases where the shower 12 does not interfere with a decompression pathway, a decompression panel 22 is not necessary. The decompression connectors 60 break when the differential between pressures on opposite sides of the panel 22 reaches a predetermined threshold (i.e., breakage threshold). For instance, if the cabin is subjected to decompression in the first zone A while the shower doors 20 and 21 are closed, the pressure differential may reach a breakage threshold. A decompression pathway is therefore defined through the shower enclosure 12 by the door 21 and the decompression panel 22.

Each decompression connector 60 has a back plate 61 and a mounting plate 62, which jointly support a shear pin 63. The shear pin 63 is the component that breaks at the breakage threshold, whereby its characteristics are selected as a function of the breakage threshold. A seal member 64 and a decorative plate 65 are sandwiched between the decompression panel 22 and the support wall 23, to prevent water leakage between the panel 22 and the wall 23. A retaining block 66 is imbedded in the support wall 23 and defines a pin hole for accommodating an end of the shear pin 63. Therefore, in the illustrated embodiment, the decompression panel 22 is supported by four shear pins 63. Alternatives to the decompression connectors 60 are considered. For instance, the shower enclosure 12 may be provided with vent holes in its support wall 23 to avoid a pressure differential between the interior and the exterior of the shower enclosure 12. The above-described decompression configuration is visually discreet, as the decompression panel 22 looks like a typical see-through shower panel.

Referring to FIG. 1, plumbing hardware used with the shower unit 11 is described. It is pointed out that some of the plumbing hardware may be optional, such as the water tester 36', the handheld shower head 36" or a gray water tank. Moreover, the shower system 10 of FIG. 1 is represented in a schematic view, whereby the size of the components (e.g., tanks, lines) is not to scale.

A tank 80 stores water. The tank 30 may be any of a single tank, a pair of tanks, or the like. In FIG. 1 there is illustrated a pair of tanks with a capacity of 45 gallons, as an example. As the shower system 10 is optional in aircraft, the use of two tanks defines a modular solution for adding a tank to an existing aircraft water supply. Water leaving the tank 80 is directed to a water treatment device 81, such as a UV filter to purify the water, and to an in-line heater 82.

The in-line heater 82 must supply enough energy to heat the water, in accordance with the demand from the user. The heater 82 heats water to a set value, and cold water is added to the heated water through the control of the valve 36.

The temperature tester 36' may be provided in the shower unit 11. The temperature tester 36' is used by a user of the shower unit 11 to physically test the water temperature prior to actuating the shower heads. The temperature tester 36' may optionally be a handheld shower head 36".

Referring to FIG. 1, a valve 83 is provided outside of the shower enclosure 12. The valve 83 must be turned on for the shower unit 11 to be operable. The valve 83 is provided on the shower water supply line to open/close the water supply to the shower unit 11. The presence of the valve 83 ensures that the shower unit 11 does not dispense water despite an accidental turning on of the on/off valve 35.

A gray water tank 85 may be connected to the drain 53 so as to receive gray water from the shower. The tank 85 is optional, as the gray water is typically vaporized out of the airborne aircraft as the shower drain 53 is connected no the main drain 86 of the aircraft. However, in cases where a user wants the option of using the shower 12 while the aircraft is on the ground, the presence of gray water tank 85 is advantageous as some airports have regulations against dispensing liquids on the ground. In such cases, if the shower system 10 is to be used when the aircraft is grounded, a gray water tank 85 is necessary if the airport. does not provide suitable drainage facilities for the aircraft.

A ventilation duct relates the exhaust vent 32 to a fan 87. The moist air from the exhaust vent 32 is directed to an appropriate location such as a static drain port. In cases where it is desirable to remove excess moisture from the moist air, a condensation box may be added between exhaust vent 32 and the aircraft static drain. In the illustrated embodiment, the shower system 10 shares the tank 80 with the aircraft water supply. In the current embodiment, once the water in tank 80 reaches a minimum threshold level, below which the water needs of the aircraft cabin may not be met, the supply of water to shower 12 is stopped. It is therefore considered to equip the shower enclosure 12 with level indicators to indicate the amount of water remaining for the shower (e.g., the amount of time left). It is, however, possible to provide separate water tanks for the different systems.

The invention claimed is:

1. A shower unit for an aircraft, comprising:
   at least one shower head adapted to output water from a water source;
   at least one control to manually control the water output by the at least one shower head; and
   a shower enclosure defining a receiving cavity adapted to receive the user, the shower enclosure supporting the at least one shower head and the at least one control for the user to shower in the receiving cavity, the shower enclosure comprising a first door on a first side of the shower enclosure, and a second door on a second side of the shower enclosure to define a passageway through the shower enclosure;
   wherein the shower unit is adapted to be positioned in the aircraft such that the passageway communicates between two separate zones of the aircraft; and
   wherein the first door is a sliding door sliding into the receiving cavity toward an opened position, and the second door is a hinged door pivoting into the receiving cavity toward an opened position, to define the passageway.

2. The shower unit according to claim 1, wherein the first door and the second door are on a same side of the passageway when opened.

3. The shower unit according to claim 2, wherein the first door and the second door are opposite the at least one control when opened.

4. The shower unit according to claim 1, comprising a decompression panel in the shower enclosure, the decompression panel adapted to separate from a remainder of the shower enclosure when a pressure differential between an interior and an exterior of the shower enclosure is above a predetermined threshold.

5. The shower unit according to claim 4, wherein the decompression panel is made of at least one of a translucent and a transparent material adapted to allow light to pass from an exterior to an interior of the shower enclosure.

6. The shower unit according to claim 4, wherein the decompression panel is connected to a remainder of the shower enclosure by shear pins adapted to break at the predetermined threshold.

7. The shower unit according to claim 1, further comprising a shower console having a body connecting the at least one shower head and the at least one control to the shower enclosure.

8. The shower unit according to claim 7, further comprising a floor light at a bottom of the shower console to illuminate the passageway.

9. The shower unit according to claim 7, further comprising light sources between vertical edges of the body and the shower enclosure.

10. The shower unit according to claim 1, further comprising an exhaust vent in the shower enclosure, the exhaust vent being adapted to exhaust moist air from the shower enclosure.

11. The shower unit according to claim 1, further comprising an integral floor module, the integral floor module having an upper surface molded to define upwardly projecting tiles between channels, the upper surface being pan-shaped to direct water from the channels to a drain.

12. The shower unit according to claim 1, further comprising a cavity in a wall of the shower enclosure and a bar transversely positioned in the cavity to define a rack for holding objects, the bar being anchored to the wall of the shower enclosure so as to form a handrail adapted to be held by a user in case of turbulence.

13. The shower unit according to claim 12, wherein the level of a floor of the shower enclosure is below the level of floors surrounding the shower enclosure opposite the first door and the second door.

14. The shower unit according to claim 13, further comprising a mat releasably positioned on the floor of the shower enclosure when the shower enclosure is used as a passage, the mat having a thickness such that a top surface of the mat is generally flat and level with the floors surrounding the shower enclosure opposite the first door and the second door.

15. The shower unit according to claim 1, further comprising a valve outside of the shower enclosure, the valve allowing/blocking a supply of water to the at least one shower head independently from the at least one control.

16. An aircraft comprising:
a fuselage with at least two separate zones;
a shower unit in the fuselage, the shower unit comprising:
at least one shower head adapted to output water from a water source;
at least one control to manually control the water output by the at least one shower head; and
a shower enclosure defining a receiving cavity adapted to receive the user, the shower enclosure supporting the at least one shower head and the at least one control for the user to shower in the receiving cavity, the shower enclosure comprising a first door on a first side of the shower enclosure, and a second door on a second side of the shower enclosure to define a passageway through the shower enclosure, the shower enclosure being positioned relative to the fuselage such that the passageway communicates between the two separate zones of the aircraft; and
wherein the washroom zone is between a baggage zone and a cabin zone of the fuselage, with the passageway being the sole access between the baggage zone and the cabin zone.

17. The aircraft according to claim 16, wherein the shower enclosure is oriented in the aircraft such that a user's intended position within the shower enclosure is in register with a vertical plane in which lies a central longitudinal axis of fuselage of the aircraft.

18. The aircraft according to claim 16, wherein the shower unit is in a washroom zone of the fuselage, the washroom zone extending the full width of the fuselage.

* * * * *